(12) United States Patent
Kamata et al.

(10) Patent No.: US 8,859,640 B2
(45) Date of Patent: Oct. 14, 2014

(54) COLORING INK FOR ELECTRICAL WIRE

(75) Inventors: Takeshi Kamata, Shizuoka (JP); Keigo Sugimura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 519 days.

(21) Appl. No.: 12/308,764

(22) PCT Filed: Jun. 26, 2007

(86) PCT No.: PCT/JP2007/063199
§ 371 (c)(1),
(2), (4) Date: Dec. 23, 2008

(87) PCT Pub. No.: WO2008/007573
PCT Pub. Date: Jan. 17, 2008

(65) Prior Publication Data
US 2009/0281228 A1 Nov. 12, 2009

(30) Foreign Application Priority Data
Jul. 10, 2006 (JP) ................. 2006-189011

(51) Int. Cl.
*C09D 11/107* (2014.01)
*C09D 11/30* (2014.01)

(52) U.S. Cl.
CPC .............. *C09D 11/30* (2013.01); *C09D 11/107* (2013.01)
USPC ..................... 523/160; 106/31.57; 106/31.58; 106/31.86; 106/31.85; 106/31.13; 524/503

(58) Field of Classification Search
CPC ....... C09D 11/033; C09D 11/36; C09D 11/02
USPC ..................... 523/160, 161; 106/31.13; 8/582; 524/503
See application file for complete search history.

(56) References Cited

U.S. PATENT DOCUMENTS

| | | | | |
|---|---|---|---|---|
| 4,070,322 A | * | 1/1978 | Hwang et al. | 524/364 |
| 4,543,102 A | * | 9/1985 | Defago et al. | 8/471 |
| 4,883,714 A | * | 11/1989 | Stockl et al. | 428/195.1 |
| 5,607,999 A | * | 3/1997 | Shimizu et al. | 524/503 |
| 6,110,266 A | * | 8/2000 | Gonzalez-Blanco et al. | 106/31.65 |
| 2005/0101694 A1 | * | 5/2005 | Elmer et al. | 523/160 |
| 2006/0266259 A1 | * | 11/2006 | Bedford et al. | 106/31.27 |

FOREIGN PATENT DOCUMENTS

| | | |
|---|---|---|
| EP | 0096806 | 12/1983 |
| EP | 1548757 | 6/2005 |
| JP | 05-111947 | 5/1993 |
| JP | 06-119833 | 4/1994 |
| JP | 09-092056 | 4/1997 |
| JP | 2004-134371 | 4/2004 |
| WO | WO-03/019580 | 3/2003 |

OTHER PUBLICATIONS

International Search Report mailed Oct. 26, 2007, issued on PCT/JP2007/063199.
Written Opinion of the International Searching Authority, issued on PCT/JP2007/063199, Oct. 26, 2007.

* cited by examiner

*Primary Examiner* — Irina Krylova
(74) *Attorney, Agent, or Firm* — Edwards Wildman Palmer LLP; James E. Armstrong, IV

(57) ABSTRACT

The present invention is to provide a coloring ink for an electrical wire to prevent a color irregularity. A coloring ink is ejected to an outer surface of an electrical wire with a certain amount of the ink to form a mark. The coloring ink contains 100 parts by weight of an ink material, which contains a solvent, an acrylic resin, and a coloring material, and 5-15 parts by weight of an aqueous PVA solution. A concentration of the aqueous PVA solution is 10-15 %.

1 Claim, 4 Drawing Sheets

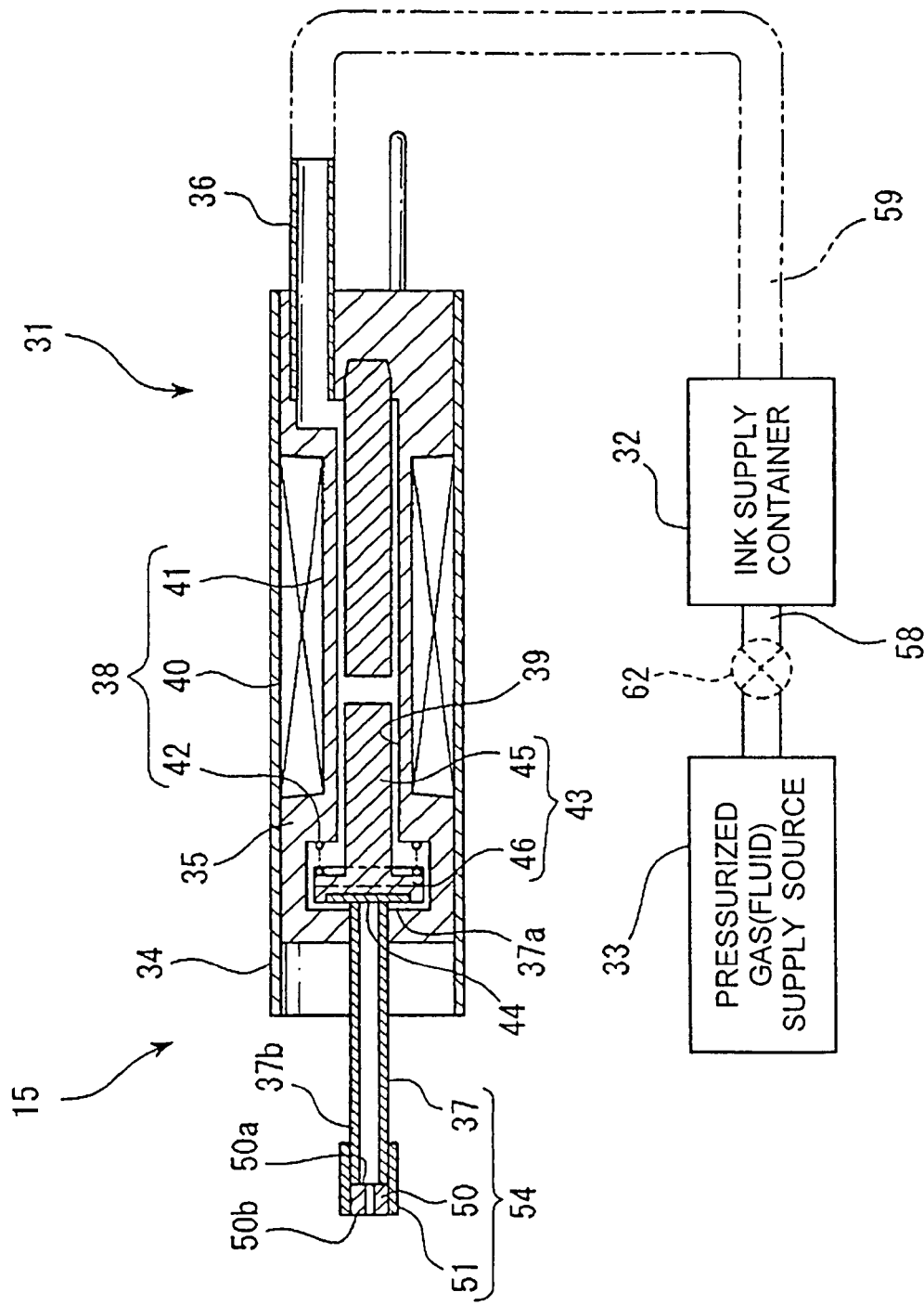

COLORING INK FOR ELECTRICAL WIRE

TECHNICAL FIELD

The present invention relates to a coloring ink for ejecting a certain amount of thereof to color an outer surface of an electrical wire.

RELATED ART

A vehicle such as a motor vehicle has a variety of electronic devices. The motor vehicle has wire harnesses to supply an electrical power and to transmit a control signal of a computer to the electronic devices. The wire harnesses each have a plurality of electrical wires and connectors attached to ends of the electrical wires.

Each electrical wire has a conductive wire and an insulation cover made of a synthetic resin. Each connector has a terminal and a connector housing to receive the terminal. The terminal is made of a conductive metal plate and connected to the conductive wire. The connector housing is made of a synthetic resin and formed in a box shape. The wire harnesses supply the electrical power and the signal to the electronic devices through the terminals of the connector housings.

Each wire harness is assembled by cutting the electrical wires with a certain length, stripping the insulation covers of the end portions thereof, attaching the terminal, connecting the electrical wires each other if necessary, inserting the terminal into the connector housing.

The electrical wires of each wire harness are identified about a size of the conductive wire, a material of the insulation cover (for example, heat resistance), and purpose of use. The purpose of use is classified into a control signal such as air-bag, ABS (Antilock Brake System), speed and a power transmission.

The electrical wires of the wire harness are colored by extruding the synthetic resin containing a coloring agent around the conductive wire, for example, JP-H05-111947-A, JP-H06-119833-A, JP-H09-92056-A. Every time the color of the outer surface is changed, it is necessary to halt an extrusion coating apparatus. Labor hour is thus required for manufacturing of the electrical wire.

In the conventional method, the coloring agent is changed during coating the electrical wire with the extrusion coating apparatus. This method causes a mixed color of the insulation cover due to mixing of the last color and the next color, so that a yield of the material of the electrical wire is reduced.

The applicant of the present invention proposed a method of assembling a wire harness to avoid the lower productivity and lower yield of the electrical wire in WO-A1-2003/019580. In this method, the electrical wire having a single color is manufactured and an outer surface thereof is colored if necessary. The applicant of the present invention proposed an apparatus for coloring an electrical wire by ejecting a certain amount of a coloring ink to an outer surface thereof, see JP-2004-134371-A.

The coloring apparatus utilizes the coloring ink containing an organic solvent as a solvent, PMMA (poly(methyl methacrylate)) as a binder, a coloring material, and a dispersing agent. The coloring apparatus is arranged in processes of cutting the electrical wires and crimping terminals to end portions thereof.

DISCLOSURE OF THE INVENTION

The conventional coloring ink has a relatively low viscosity and dries quickly. When the coloring ink is adhered to the electrical wire, an outer edge of a droplet of the coloring ink dries quickly and the coloring material of the center of the droplet flows to the outer edge of the droplet. The conventional coloring ink causes a concentration of the coloring material and a binder with small particles to a surface layer of the ink due to a fast drying, so called migration, and the coloring material builds up on the outer edge of the colored portion. The concentration of the coloring material at the outer edge of the colored portion causes a color irregularity.

A worker accordingly fails to identify the electrical wire depending on a direction of his view during assembly of the wire harness.

An object of the present invention is to provide a coloring ink for an electrical wire, and the coloring ink especially prevents a color irregularity of a mark on the electrical wire.

According to a first object of the present invention, a coloring ink for coloring an outer surface of an electrical wire with a certain amount thereof contains 100 parts by weight of an ink material including a solvent, an acrylic resin, and a coloring material; and 5-15 parts by weight of an aqueous PVA solution.

Preferably, the aqueous PVA solution has a concentration of 10-15%.

The coloring ink contains 100 parts by weight of the ink material and 5-15 parts by weight of the aqueous PVA solution. The coloring ink delays drying rate of a droplet adhered to the outer surface of the electrical wire so as to prevent concentration of the acrylic resin to an outer layer of the droplet during drying. The coloring ink improves a dispersibility of the coloring material and thus prevents a color irregularity. The suitable delay of drying of the droplet prevents dirt of the outer surface of the electrical wire.

The coloring ink contains the 10-15% aqueous PVA solution. The coloring ink thus prevents the concentration of the acrylic resin to the outer layer of the droplet during drying and improves the dispersibility of the coloring material and thus prevents the color irregularity.

BRIEF DESCRIPTION OF THE DRAWINGS

FIG. 3 is a sectional view showing a configuration of a coloring nozzle of the ink ejection unit of FIG. 2;

BEST MODE FOR CARRYING OUT THE INVENTION

A coloring apparatus 1 of an electrical wire 3 is depicted in FIGS. 1-4. The coloring apparatus 1 utilizes a coloring ink, hereafter referred to simply "ink". The coloring apparatus 1 cuts the electrical wire 3 with a certain length, and forms a mark 6 on a part of an outer surface 3a of the electrical wire 3. The coloring apparatus 1 colors the outer surface 3a of the electrical wire 3.

Figure 4A:
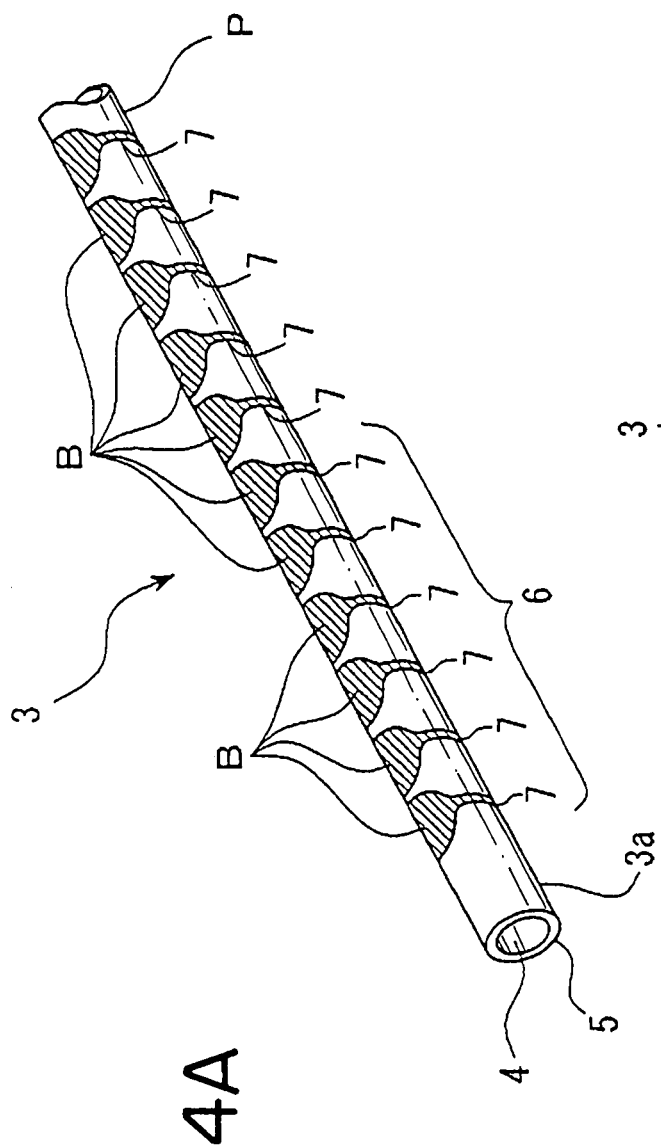
FIG. 4A is a perspective view of an electrical wire colored with the coloring apparatus of FIG. 1.

The electrical wire 3 is assembled in a wire harness arranged in a vehicle such as a motor vehicle and has a conductive wire 4 and an insulation cover 5 as shown in FIG. 4A. The conductive wire 4 is made of a conductive metal and is formed with a plurality of wires or a single wire. The insulation cover 5 is made of a synthetic resin such as Polyvinyl chloride (PVC) or polyolefin (PE, PP) and covers the conductive wire 4.

The insulation cover 5 has either a plain color P of the synthetic resin itself or a plain color P of a coloring agent contained in the synthetic resin. When the insulation cover 5 has the plain color P of the synthetic resin itself without the coloring agent, it is called that the outer surface 3a of the electrical wire 3 is non-colored. The outer surface 3a may be non-colored or have a white color.

Figure 4B:
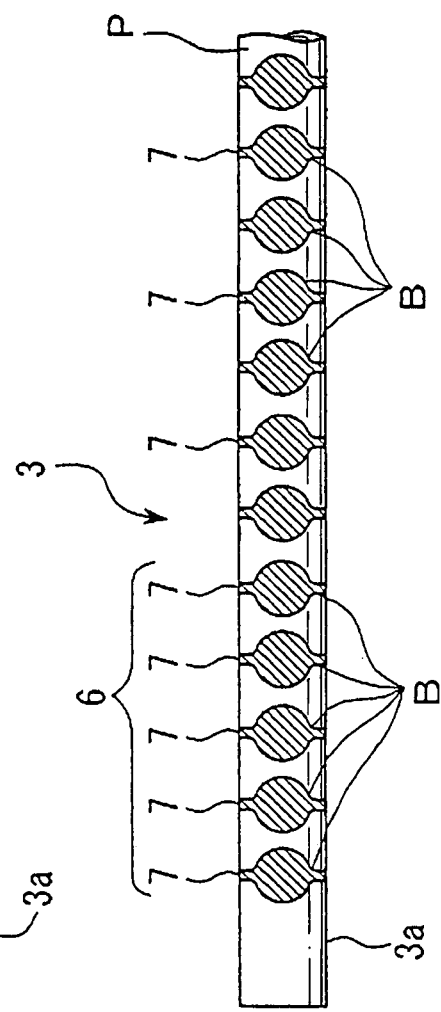
FIG. 4B is a plan view of the electrical wire of FIG. 4A.

The electrical wire 3 has the mark 6 formed with a plurality of dots 7 on the outer surface 3a thereof. The dots 7 are colored with a color B, indicated by parallel diagonal lines, different from the plain color P. The dots 7 are arranged with a certain pattern along a longitudinal direction of the electrical wire 3. FIGS. 4A and 4B show an equally spaced arrangement of the dots 7. A distance between the dots 7 is determined beforehand.

The electrical wires 3 are bundled and connected with a connector at end portions thereof to form the wire harness. The connector is connected to a connector of each electronic device of the motor vehicle to supply an electrical power or signal.

The kinds of the colors B of the dots 7 identify kinds of the electrical wires 3. The dots 7 colored with the same color B each may be colored with a different color if necessary. The color B of the dots 7 of the mark 6 identifies the kind and arrangement of the electrical wire 3 of the wire harness.

Figure 1:
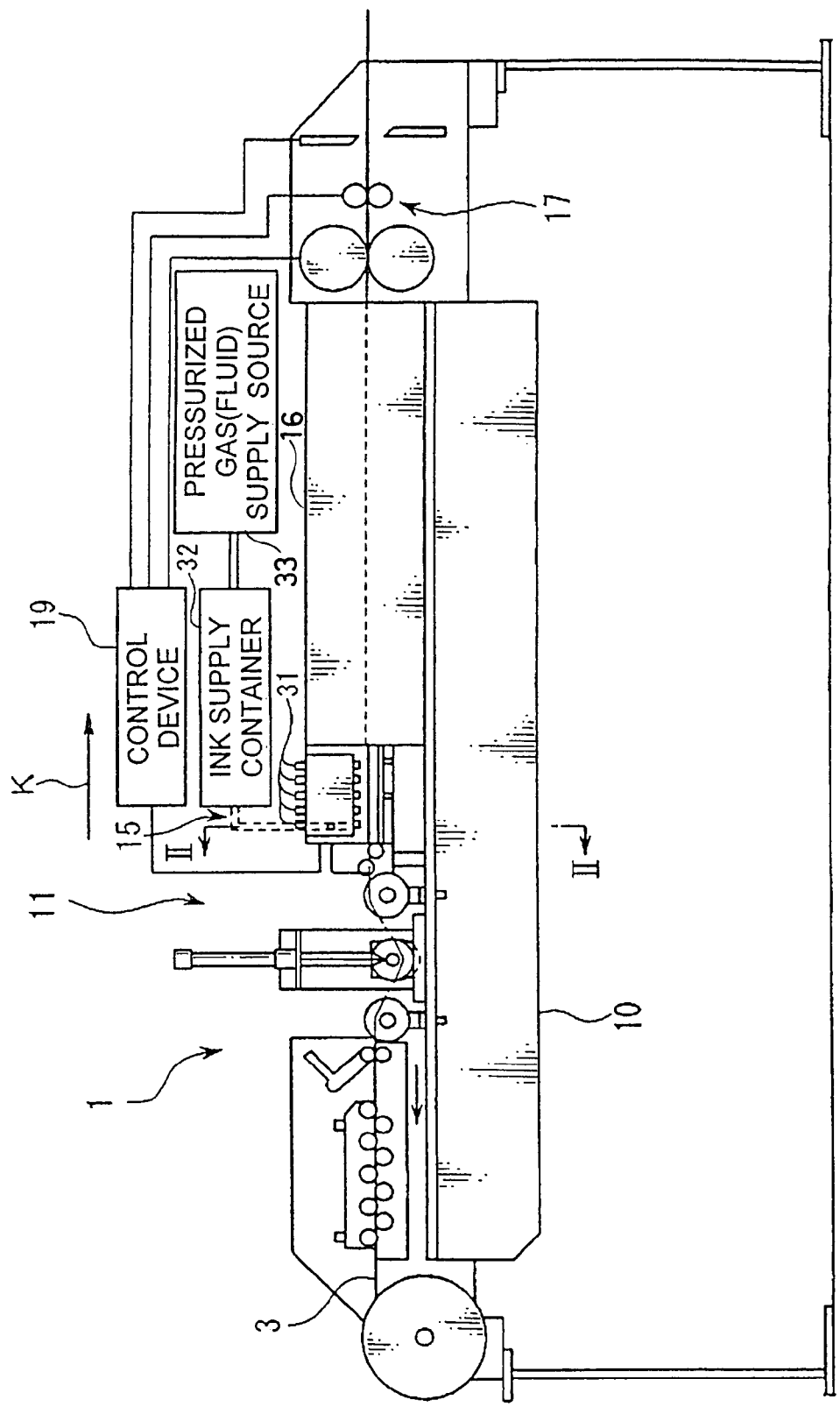
FIG. 1 is a sectional view showing a coloring apparatus having an ink ejection unit for ejecting an embodiment of a coloring ink of the present invention.

Referring to FIG. 1, the coloring apparatus 1 includes a frame 10, a transfer unit 11, an ink ejection unit 15, and a control device 19.

The frame 10 is placed on a floor of a factory and extends horizontally. The transfer unit 11 transfers the lengthy electrical wire 3 in a longitudinal direction and cuts the wire with a desired length in accordance with a command from the control device 19. The transfer unit 11 has an encoder 17, which is connected with the control device 19, for outputting movement of the electrical wire 3 to the control device 19. An arrow K of FIG. 1 indicates a direction of movement of the electrical wire 3.

Figure 2:
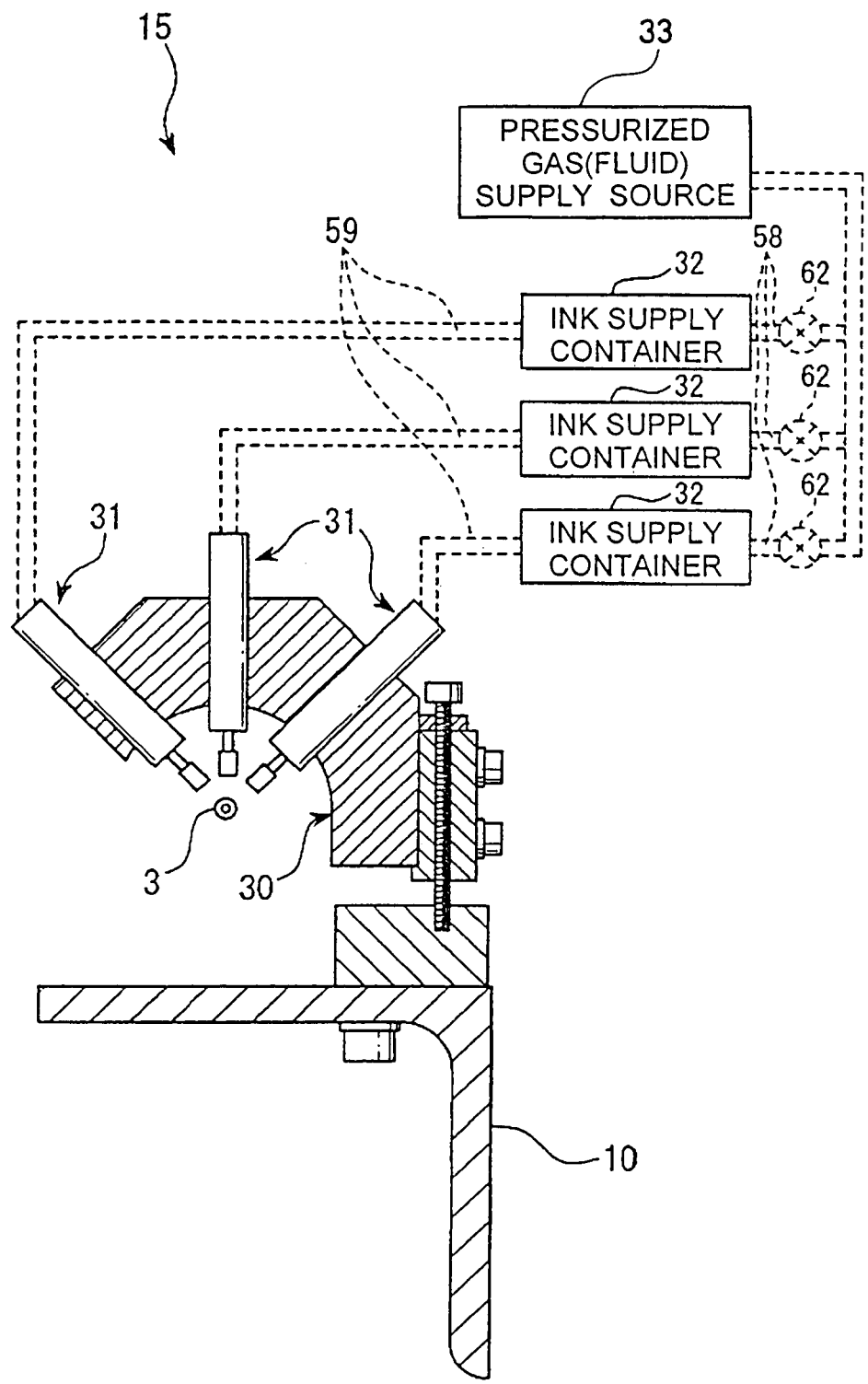
FIG. 2 is a sectional view of the ink ejection unit of the coloring apparatus, taken along the line II-II of FIG. 1.

The ink ejection unit 15 includes, as shown in FIG. 2, a unit main body 30, a plurality of coloring nozzles 31, a plurality of ink supply containers 32, and a pressurized gas (fluid) supply source 33. The unit main body 30 is fixed to the frame 10 and supports the coloring nozzles 31.

The coloring nozzles 31 each eject a certain amount of a liquid ink supplied from the ink supply containers 32 to the outer surface 3a of the electrical wire 3. The ejected droplets of the ink are adhered to the outer surface 3a of the electrical wire 3 to color (mark) the part of the outer surface 3a.

Referring to FIG. 3, each coloring nozzle 31 has a cylindrical nozzle main body 34, an insertion member 35 received in the nozzle main body 34, an inlet tube 36, a nozzle 54, and a solenoid valve 38.

The insertion member 35 is formed in a cylindrical shape and has a flow passage 39 therein to allow flow of the ink. The flow passage 39 is filled with the ink supplied from the ink supply container 32. The insertion member 35 receives the liquid ink of the present invention. The inlet tube 36 is communicated with the flow passage 39.

The nozzle 54 includes a first nozzle member 37, a second nozzle member 50, and a connection tube 51. The first nozzle member 37 is formed in a cylindrical shape and communicated with the flow passage 39 to guide the ink outside the coloring nozzle 31. The first nozzle member 37 has an inner diameter smaller than an outer diameter of the flow passage 39. The first nozzle member 37 is made of a stainless steel and is coaxial with the nozzle main body 34.

The second nozzle member 50 has a cylindrical shape and is formed with Polyetheretherketone (PEEK) and has an outer diameter same as an outer diameter of the first nozzle member 37. The nozzle 54 has the cylindrical shape and is communicated with the insertion member 35 to allow flow of the ink.

The second nozzle member 50 has an inner diameter smaller than that of the first nozzle member 37 and is coaxial with the first nozzle member 37 and connected thereto.

The second nozzle member 50 is arranged closer to the electrical wire 3 than the first nozzle member 37. A contact portion between the first and second nozzle members 37 and 50 is kept watertight. The ink flows along an axis of the first nozzle member 37.

The second nozzle member 50 has a flat end surface 50a contacting an end portion of the first nozzle member 37.

The connection tube 51 is made of a fluorine resin and formed in a cylindrical shape. The connection tube 51 is detachably connected with the first nozzle member 37 and the second nozzle member 50.

The solenoid valve 38 has a coil 40, a valve main body 41, and a coil spring 42. The coil 40 is embedded in the insertion member 35 and separated from the flow passage 39. A drive current is applied to the coil 40. The valve main body 41 includes a conductive main body 43 and a valve 44. The main body 43 has a cylinder 45 and a circular disk 46 connected to one end of the cylinder 45.

The disk 46 faces a base end 37a of the first nozzle member 37. A longitudinal direction of the cylinder 45 is parallel to the longitudinal direction of the nozzle main body 34. The main body 43 is movable in the longitudinal direction of the nozzle main body 34.

The valve 44 is attached to the disk 46 of the main body 43. The valve 44 is received in the insertion member 35. The valve 44 faces the base end 37a of the first nozzle member 37 and comes in contact with or departs from the base end 37a. When the valve 44 comes in contact with the base end 37a of the first nozzle member 37, the watertight therebetween prevents the ink from entering into the first nozzle member 37. When the valve 44 departs from the base end 37a, the ink is allowed to be ejected to the outer surface 3a of the electrical wire 3 through the first and second nozzle members 37 and 50.

In this manner, the valve 44 comes in contact with, shown by a solid line in FIG. 3, or departs from, shown by a dashed double-dotted line in FIG. 3, the base end 37a. When the valve 44 comes in contact with the base end 37a, the flow of the ink is restrained. When the valve 44 is opened, the nozzle 54 ejects the ink.

The coil spring 42 urges the disk 46 toward the base end 37a of the first nozzle member 37.

As an example, FIG. 1 shows that five coloring nozzles 31 are attached to the unit main body 30 along the direction K of movement of the electrical wire 3.

Referring to FIG. 2, the coloring nozzles 31 are disposed on the unit main body 30 to eject the certain amount of the ink toward an uppermost portion of the electrical wire 3.

Each of the coloring nozzles 31 accepts the ink from the respective ink supply containers 32.

The ink supply containers 32 each are connected to an ink discharge conduit 59 and a gas supply conduit 58. The pressurized gas flows through the gas supply conduits 58. Valves 62 disposed between the pressurized gas (fluid) supply source 33 and the gas supply conduits 58 regulate the flow of the pressurized gas.

The ink discharge conduits 59 are connected to the inlet tubes 36 of the coloring nozzles 31. The pressurized gas from the pressurized gas supply source 33 discharges the ink of the ink supply containers 32 to the coloring nozzles 31 via the ink discharge conduits 59.

The pressurized gas supply source 33 supplies the gas to either the plurality of the ink supply containers 32 or the associated container 32.

The ink ejection unit 15 opens the valves 62 in accordance with the command of the control device 19 and keeps the ink supply containers 32 at a certain pressure to supply the ink to the coloring nozzles 31.

A voltage is applied to the coil 40 of the desired coloring nozzle 31 and the valve 44 is separated from the base end 37*a* of the first nozzle member 37 in response to the command from the control device 19. Thereby, the coloring nozzle 31 ejects every the certain amount of the ink of the flow passage 39 to the electrical wire 3.

The present invention utilizes the ink having a viscosity of at most 10 mPa·s. The ink contains a coloring material (an industrial organic material) dissolved or dispersed in water or other solvents. The organic materials of the coloring materials are dye or pigment (mostly synthesis). The dye is utilized as the pigment and vice versa. The ink is coloring liquid or paint.

The coloring liquid is prepared by dissolving or dispersing the dye in the solvent, while the paint is prepared by dispersing the pigment in the solvent. Therefore, when the coloring liquid is adhered to the outer surface 3*a* of the electrical wire 3, the dye is infiltrated into the insulation cover 5. On the other hand, when the paint is adhered to the outer surface 3*a* of the electrical wire 3, the pigment is not infiltrated into the cover 5, but simply adhered to the outer surface 3*a*.

In other words, the ink ejection unit 15 serves to dye the part of the outer surface 3*a* of the electrical wire 3 with the dye, or alternatively, to apply the pigment to the part of the outer surface 3*a* of the electrical wire 3. Therefore, a method for marking the outer surface 3*a* of the electrical wire 3 includes both dyeing the part of the outer surface 3*a* with the dye, or applying the pigment to the part of the outer surface 3*a* of the electrical wire 3.

It is preferable that the solvent is compatible with the synthetic resin of the insulation cover 5 so that the dye can be reliably infiltrated into the cover 5, and the pigment can be reliably adhered to the insulation cover 5.

The liquid ink is ejected to the outer surface 3*a* of the electrical wire 3 with a liquid drop, that is, droplet from the each coloring nozzle 31.

The control device 19 is a computer having known RAM, ROM, CPU and connected to the transfer unit 11, the ink ejection unit 19, and other devices to control their operations and the coloring apparatus 1.

The control device 19 stores a pattern of the mark 6 beforehand. The control device 19 controls the valves 62 to keep the pressure of the ink supply containers 32 to a certain level enough to discharge the inks inside the containers 32. When the control device 19 accepts a pulse signal, that is an information about an amount of movement of the electrical wire 3, from the encoder 17, the control device 19 effectuates the application of the voltage to the coil 40 for a certain period of time to eject the certain amount of the ink toward the electrical wire 3 via the coloring nozzle 31. The control device 19 controls a time interval of ejection of the ink depending on the speed of movement of the electrical wire 3. The time interval becomes shorter or longer in response to higher or lower speed of the movement. The control device 19 controls coloring of the electrical wire 3 in accordance with the stored pattern of the mark 6. The control device 19 controls the ejecting amount of the ink in response to the amount of movement of the electrical wire 3 measured with the encoder 17.

The control device 19 halts the electrical wire 3 with a certain amount of the movement based on the information from the encoder 17 and cuts the electrical wire 3.

In order to form the mark 6 on the outer surface 3*a* of the electrical wire 3 with the coloring apparatus 1, the lengthy electrical wire 3 is attached to the frame 10.

The gas supply conduits 58 and the ink discharge conduits 59 are connected to the ink supply containers 32 filled with the prescribed inks. The pressurized gas (fluid) supply source 33 and the coloring nozzles 31 are connected with the respective conduits. The coloring nozzles 31 are attached to the unit main body 30. Upon opening the valves 62, the pressurized gas is supplied to the ink supply containers 32 to eject the inks with the coloring nozzles 31.

The transfer unit 11 then transfers the electrical wire 3 in the longitudinal direction thereof.

The control device 19 controls to energize the coil 40 of the relevant coloring nozzle 31 for a certain period of time with a certain interval and controls the ejection of the certain amount of the ink to the outer surface 3*a* of the electrical wire 3.

The solvent evaporates from the ink adhered to the outer surface 3*a* of the electrical wire 3, so that the electrical wire 3*a* is dyed or painted. The evaporated solvent is exhausted from a duct of the transfer unit 11 with an exhausting device.

The control device 19 halts the transfer of the electrical wire 3 at the certain length with the information from the encoder 17.

The control device 19 cuts the electrical wire 3. FIGS. 4A and 4B show the electrical wire 3 having the mark 6 on the outer surface 3*a* thereof.

When the liquid ink is ejected with the certain amount through the nozzle 54 of the coloring nozzle 31, the ink impinges on the end surface 50*a* of the second nozzle member 50 and partly swirls. The ink is thereby stirred and attains a uniform concentration in the second nozzle member 50.

When the ink flows from the flow passage 39 to the first nozzle member 37, the ink is pressurized and keeps a constant pressure. When the ink impinges the end surface 50*a*, the ink rapidly attains a high pressure and is ejected to the outer surface 3*a* of the electrical wire 3 through the second nozzle member 50 and rapidly reaches to a low pressure.

When the ink flows into the first nozzle member 37 from the flow passage 39, the ink flows slowly and attains a constant velocity and attains a lower velocity toward the second nozzle member 50.

When the ink impinges the end surface 50*a*, the ink rapidly attains a high velocity. The ink accordingly attains the high pressure and high speed in the second nozzle member 50 and is ejected toward the outer surface 3*a* of the electrical wire 3.

The coloring ink utilized contains 100 parts by weight of an ink material and 5-15 parts by weight of a 10-15% aqueous PVA (Polyvinylalcohol) solution. The ink material contains the solvent, an acrylic resin, and the coloring material.

The ink contains, for example in the present invention, 96 parts by weight of the solvent, 3 parts by weight of the acrylic resin, and 1 part by weight of the coloring material. Ketone (organic solvent) is utilized as the solvent in view of solubility of the acrylic resin, volatility, and handling. Acetone and methyl ethyl ketone are utilized for the ketone. The ketone may contain a volatile alcohol such as methanol and ethanol.

The coloring material contains the pigment, the dye, or the mixture thereof, which are utilized for an inkjet ink. The amount of the coloring material is adapted such that the outer surface 3a of the electrical wire 3 is clearly marked and the ink is adequately ejected.

The pigment is selected so as to be uniformly dispersed in the solvent of the acrylic resin and not to clog the coloring nozzle 31. The dye is selected from yellow, red, blue, and black and they are available from Orient Chemical Industries, LTD. The yellow is an OilYellow 129 (C.I. SolventYellow 29) and OilYellow 3G (C.I. SolventYellow 16), the red is an OilRed 513 (C.I. SolventRed 27) and OilRed RR (C.I. SolventRed 24), the blue is an OilBlue 2N (C.I. SolventBlue 35) and FastBlue 1605 (C.I. SolventBlue 38), and the black is an OilBlack HBB (C.I. SolventBlack 8) and an OilBlack BS (C.I. SolventBlack 7).

The pigment or the mixture thereof with the dye is adapted for the electrical wire 3 having a deep color of the outer surface 3a and the dye is also adapted for the white or pale color.

The acrylic resin is selected from polymethyl methacrylic, polymethyl acrylic, the modifications thereof and also selected more than two kinds.

The acrylic resin of the present invention may contain a rubber component to improve fastness of the mark. Such resin is available from Asahi Kasei Corporation.

The ink material may contain a dispersant to improve dispersion of dispersible component of the pigment and a viscosity adjuster.

The concentration of the aqueous PVA solution of the present invention is defined with percent in mass, that is [(mass of PVA)/(total mass of PVA solution)]*100.

The ink is formed by stirring, mixing, dissolving, and dispersing the above raw materials to adjust the viscosity of the ink so that the nozzle 54 (inner diameter of 0.03-0.1 mm) can eject an adequate amount of the droplet (10-100 nL). The viscosity at an operating temperature is usually 0.1-2 mPa·s and preferably 0.5-1.4 mPa·s. The coloring material is added by the amount to provide a sufficient appearance.

The ink of the present invention, which contains 100 parts by weight of the ink material and 5-15 parts by weight of the aqueous PVA solution, delays drying of the droplet adhered to the outer surface 3a of the electrical wire 3 and prevents the concentration of the coloring material at the outer edge of the droplet. The ink improves the dispersibility thereof and prevents an irregular coloring.

The addition of the aqueous PVA solution to the ink material controls evaporation of the solvent and concentration of the ink, and prevents deterioration of fastness of the painted mark.

The delay of drying of the ink prevents spreading of the ink over the outer surface 3a of the electrical wire 3.

The ink of the present invention, which contains the 10-15% aqueous PVA solution, prevents the concentration of the acrylic resin to the surface during drying and improves the dispersibility of the coloring material and prevents the irregular coloring.

The coaxial arrangement of the first and second nozzle members 37, 50 assists straight impingement to the end surface 50a of the second nozzle member 50 and assuredly stirs the ink, so that the dye or pigment of the coloring material in the ink achieves a uniform concentration. The ejection of the excessively concentrated ink is prevented.

The high pressure of the ink induced in the second nozzle member 50 achieves a forceful ejection to the electrical wire 3 and avoids sticking of the ink to the second nozzle member 50.

Accordingly, the ink is ejected by the certain amount to the outer surface 3a of the electrical wire 3. The ejection of the ink is not interfered with the stuck ink in the second nozzle member 50. The coloring nozzle 31 colors the outer surface 3a of the electrical wire 3 at the desired position and area (size) of the dots 7 with the desired color.

The electrical wire 3 is colored while the electrical wire 3 and the coloring nozzle 31 are relatively moved in the longitudinal direction of the electrical wire 3. The electrical wire 3 is continuously colored and the operation efficiency is not reduced. The certain amount of the ink is ejected to the electrical wire 3 moving relative to the coloring nozzle 31 and can continuously color any position of the electrical wire 3.

The control device 19 controls the coloring nozzle 31 in response to the amount of movement of the electrical wire 3 measured with the encoder 17. The control device 19 controls the time interval of ejection of the ink in response to the speed of movement of the electrical wire 3 so as to keep the constant spacing between the dots 7 on the outer surface 3a of the electrical wire 3.

The prescribed pattern is thus adhered on the electrical wire 3 even though the speed of movement of the electrical wire 3 varies.

The 5%, 10%, 15%, 20% aqueous PVA solutions each was added by 3, 5, 10, 15, 20 parts by weight to 100 parts by weight of the ink material, respectively. The mark 6 was formed on the outer surface 3a of the electrical wire 3 and evaluated about characteristics. TABLE 1 shows the evaluated results.

TABLE 1

| | | PVA concentration (%) | | | | | | | | | | |
|---|---|---|---|---|---|---|---|---|---|---|---|---|
| | | 5 | | | 10 | | | 15 | | | 20 | | |
| | | CI | F | M | CI | F | M | CI | F | M | CI | F | M |
| parts by | 3 | X | X | ○ | X | X | ○ | X | X | ○ | X | X | ○ |
| weight of | 5 | X | X | ○ | ○ | ○ | ○ | ○ | ○ | ○ | ○ | ○ | ○ |
| aqueous | 10 | ○ | X | ○ | ○ | ○ | ○ | ○ | ○ | ○ | ○ | ○ | X |
| PVA | 15 | ○ | X | ○ | ○ | ○ | ○ | ○ | ○ | ○ | ○ | ○ | X |
| solution | 20 | ○ | X | X | ○ | ○ | X | ○ | ○ | X | ○ | ○ | X |

CI: color irregularity,
F: fastness,
M: merging

The ink material of TABLE 1 contains 96 parts by weight of at least 99% acetone as the solvent, 3 parts by weight of PMMA (poly(methyl methacrylate)) as the acrylic resin, and 1 part by weight of the oil soluble dye as the coloring material (C.I. SolventBlue, product of Orient Chemical Industries, LTD.). The marks of TABLE 1 were formed on the electrical wire 3 having the insulation cover 5 of polypropylene, the outer diameter of 1.4 mm, and a white appearance. The marks were formed with the nozzle 54 of an inner diameter of 0.065 mm and the thickness of the dried mark was about 10 μm.

A symbol ○ of the color irregularity denotes that the color irregularity occupies less than ⅓ about the total area of the respective dots 7 and the color of the dots 7 is assuredly identified. A symbol X denotes that the color irregularity occupies ⅓ or more about the total area of the respective dots 7 and the color of the dots 7 is not able to be identified.

The fastness of the marks 6 in TABLE 1 was evaluated as described below. The electrical wire 3 was held on a surface of a table having a curvature of 37.5 (15 mm) with the mark 6 facing outwardly against the surface. The electrical wire 3 was depressed with a white felt (No. 2, 80% sheep wool, thickness 3 mm, product of Mitsuhashi Felt) by a certain pressure and was reciprocated 30 times for a certain distance along the electrical wire 3.

A symbol ○ of the fastness in TABLE 1 denotes that, after the test, the dots 7 have shapes to be identified, and entirely or more or less keep the ink usable for the wire harness. A symbol X of the fastness denotes that the mark can not be identified due to peel-off of the ink.

A symbol ○ of the merging in TABLE 1 denotes that the ejected inks entirely cover the circumference of the electrical wire 3. A symbol X of the merging denotes that the ink of the dots 7 is not merged at a rear surface of the electrical wire 3.

TABLE 1 shows that the coloring inks containing the aqueous PVA solution of less than 10% and the ink material do not satisfy the color irregularity and the fastness. The coloring inks containing the ink material and the aqueous PVA solution of more than 15% do not especially satisfy the merging.

TABLE 1 shows that the coloring inks formed with 100 parts by weight of the ink material and less than 5 parts by weight of the aqueous PVA solution do not satisfy the color irregularity and the fastness. TABLE 1 shows that the coloring inks formed with 100 parts by weight of the ink material and more than 15 parts by weight of the aqueous PVA solution do not especially satisfy the merging.

TABLE 1 shows that the coloring inks, which contain 100 parts by weight of the ink material and 5-15 parts by weight of the 10-15% aqueous PVA solution, satisfy the color irregularity, the fastness, and the merging.

It is appreciated that the first and second nozzle members 37, 50 can be integrated together.

It is appreciated that the ink material is acrylic lacquer, ink (dye or pigment), and UV ink.

It is appreciated that the electrical wire 3 can be adapted to electronic device, for example a portable microcomputer, and electrical device, in place of the wire harness.

It is appreciated that a liquid can be utilized for pressurizing the ink supply containers 32 in place of the gas.

It is appreciated that each coloring nozzle 31 has a simple tube or orifice in place of the nozzle having the solenoid valve 38.

The embodiments of the present invention are only exemplary and not limited thereto. Any alteration and modification thereof are within the scope of the present invention.

Industrial Applicability

The coloring ink of the present invention prevents the color irregularity, controls vaporization and change of the concentration of the solvent, and prevents a reduction of fastness of the dried coloring ink.

The coloring ink of the present invention prevents the color irregularity.

The invention claimed is:

1. A coloring ink for marking dots on an outer surface of an electric wire, containing;
   100 parts by weight of an ink material containing 96 parts by weight of at least 99% acetone, 3 parts by weight of poly(methyl methacrylate), and 1 part by weight of a coloring material; and
   5-15 parts by weight of an aqueous polyvinyl alcohol solution,
   wherein the aqueous polyvinyl alcohol solution has a concentration of 10-15% by mass;
   wherein the coloring ink has a viscosity of at most 10 mPa·s; and
   wherein the coloring ink has the properties of color irregularity over less than ⅓ the total area of the respective dots, fastness such that the coloring ink of dots does not peel-off in a pressure test repeated 30 times, and merging such that ejected ink entirely covers circumference of the electrical wire to mark the respective dots.

* * * * *